(12) United States Patent
Saito et al.

(10) Patent No.: US 6,439,871 B1
(45) Date of Patent: Aug. 27, 2002

(54) MOLDING DIE FOR LAMINATED MOLDING

(75) Inventors: Yoshiaki Saito; Tomokazu Abe, both of Ichihara; Terunobu Fukushima, Maebashi, all of (JP)

(73) Assignees: Idemitsu Petrochemical Co., Ltd., Tokyo; Sanwakako Co., Ltd., Maebashi, both of (JP)

( * ) Notice: Subject to any disclaimer, the term of this patent is extended or adjusted under 35 U.S.C. 154(b) by 0 days.

(21) Appl. No.: 09/381,715

(22) PCT Filed: Mar. 11, 1999

(86) PCT No.: PCT/JP99/01172

§ 371 (c)(1),
(2), (4) Date: Sep. 22, 1999

(87) PCT Pub. No.: WO99/46106

PCT Pub. Date: Sep. 16, 1999

(30) Foreign Application Priority Data

Mar. 11, 1998 (JP) ............................................. 10-059706

(51) Int. Cl.[7] ......................... B29C 33/12; B29C 45/14; B29C 45/56
(52) U.S. Cl. ....................... 425/112; 425/123; 425/125; 425/577
(58) Field of Search ................................. 425/500, 112, 425/116, 351, 556, 577, 123, 125; 156/228, 242, 245, 252, 293, 295; 264/138, 154, 261, 265, 266, 267, 273, 275, 277, 278

(56) References Cited

U.S. PATENT DOCUMENTS

| | | | | | |
|---|---|---|---|---|---|
| 4,489,033 | A | * | 12/1984 | Uda et al. | 264/328.7 |
| 4,860,425 | A | * | 8/1989 | Kunisaki et al. | 264/261 |
| 5,283,028 | A | * | 2/1994 | Breezer et al. | 156/228 |
| 5,308,570 | A | * | 5/1994 | Hara et al. | 264/255 |
| 5,356,588 | A | * | 10/1994 | Hara et al. | 264/328.12 |
| 5,690,881 | A | * | 11/1997 | Horie et al. | 156/305 |
| 5,770,133 | A | * | 6/1998 | Boutaghou | 264/135 |
| 5,783,133 | A | * | 7/1998 | Hara et al. | 264/261 |
| 5,993,719 | A | * | 11/1999 | Abe et al. | 425/DIG. 223 |

FOREIGN PATENT DOCUMENTS

| | | |
|---|---|---|
| JP | 3-60297 | 9/1991 |
| JP | 5-8251 | 1/1993 |
| JP | 5-83056 | 11/1993 |
| JP | 8-267504 | 10/1996 |
| JP | 10-309721 | 11/1998 |

* cited by examiner

*Primary Examiner*—Angela Ortiz
(74) *Attorney, Agent, or Firm*—Flynn, Thiel, Boutell & Tanis, P.C.

(57) ABSTRACT

A molding die for shaping a laminated molding including a molding body and a compressible surface member laminated thereonto has centering pins for determining a position of the surface member protrudable and retractable relative to a cavity inside a die body. Accordingly, since the surface member can be accurately and easily positioned and held, position shift of the surface member can be securely prevented. Further, by sinking the centering pins before molten resin is solidified, influence by the centering pins can be eliminated.

9 Claims, 13 Drawing Sheets

F I G. 10
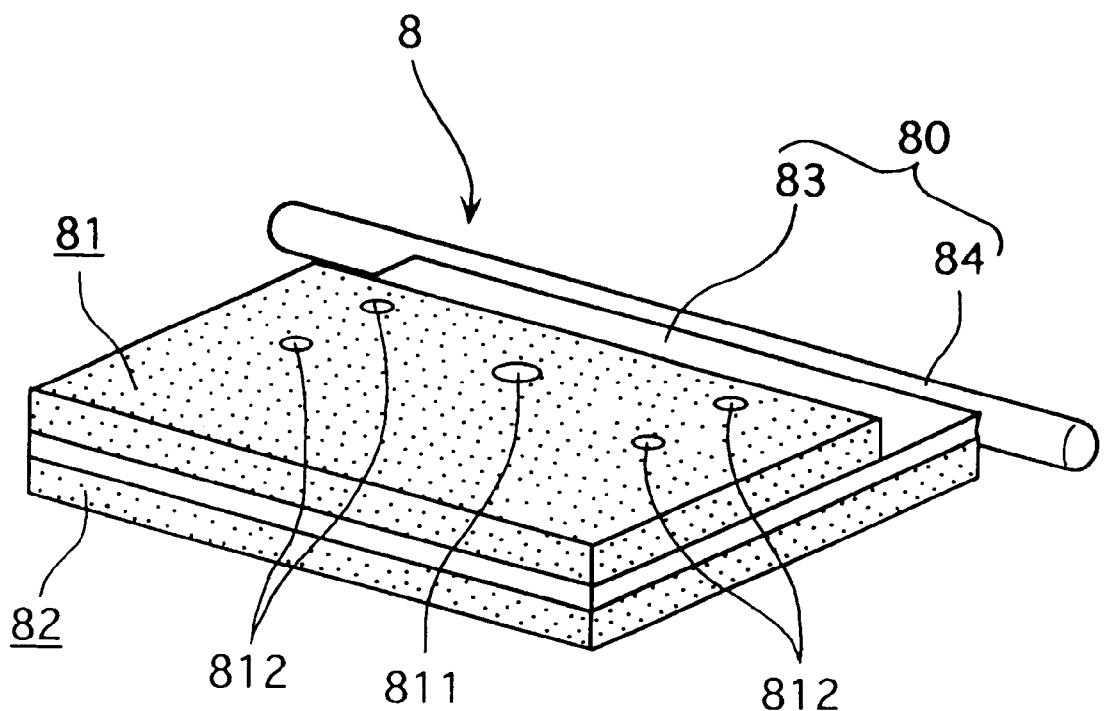

MOLDING DIE FOR LAMINATED MOLDING

FIELD OF THE INVENTION

The present invention relates to a molding die of a laminated molding. More specifically, the present invention relates to a molding die of laminated molding having a molding body made of synthetic resin and a compressible surface member laminated thereto, and a producing method for the laminated molding.

BACKGROUND OF THE INVENTION

Conventionally, products made of synthetic resin are used for interior goods of an automobile, parts of an electric appliance, household commodities etc.

Among the synthetic-resin-made products, an air-current control valve of an air conditioner for an automobile has flexible-and compressible surface members for securing sealability thereof. Further, a frame-shaped surface member as a sealing member is provided around an opening of an air-cleaner case for an automobile and a peripheral portion of an inner side of a refrigerator door in order to enhance air-tightness thereof.

Such moldings having a synthetic-resin-made molding body as a base and a surface member integrated thereto can be manufactured by the following method:

(1) Attaching the surface member by adhesive or the like onto a surface of a molding body manufactured in advance according to injection molding method or the like;

(2) Utilizing an injection molding method, where molten resin is injected into a die for integrally molding the molding body with the surface member after closing the die with the surface member being disposed therein (Japanese Patent Application Laid-open No. Hei 3-60297); and (3) Utilizing an injection press molding method, where the surface member is disposed inside the die, and the molten resin is filled inside the die and is compressed by closing and clamping the die (Japanese Patent Application Laid-open No. Hei 5-83056).

However, following disadvantages could occur according to the above methods.

Since the surface member has to be attached onto the molding after shaping the moldings according to the above (1) method, lot of work is required and the productivity can be lowered.

According to method (2) and (3), since the surface member can be integrated simultaneously with the shaping step, the productivity can be enhanced. However, a compressible surface member such as polyurethane foamed sheet is difficult to be accurately disposed to a predetermined position inside the molding die, the position of the surface member is likely to be shifted relative to the molding body from the predetermined position.

Especially, when the surface member is partially laminated to the molding body, since the surface member is required to be partially disposed to the inner surface (molding surface) of the molding die body, accurate positioning gets more difficult and the surface member is likely to be shifted.

Further, when the molten resin is injected into the inside of the molding die having the surface member disposed therein, the surface member can be pushed away by the resin pressure to cause position shift.

DISCLOSURE OF THE INVENTION

An object of the present invention is to provide a molding die of laminated molding and a producing method of the laminated molding, where the surface member can be accurately and easily disposed at a predetermined position inside the molding die.

Another object of the present invention is to provide a molding die of laminated molding and a producing method of the laminated molding, where the surface member can be accurately and easily disposed at a predetermined position inside the molding die and, further, a position shift of a surface member by a resin pressure during molding process can be prevented.

The present invention is a molding die of laminated molding for shaping the laminated molding having a molding body made of synthetic resin and a compressible surface member laminated thereonto, the molding die having a die body containing a cavity for shaping the laminated molding thereinside and a centering pin provided protrudably and retractably into the cavity for determining a position of the surface member.

In the above, the surface member includes any member that is laminated on a surface of the molding body, which may be, for instance, sheet-shaped member and belt-shaped member and the like.

Since the centering pin for determining the position of the surface member is provided in the present invention, the surface member can be accurately and easily positioned and can be kept in the condition at the predetermined position in the cavity by only engaging a predetermined portion of the surface member to the centering pin, thereby securely preventing position shift of the surface member.

Further, since the centering pin is disposed protrudably and retractably into the cavity, the molten resin can be flown into a projecting portion of the centering pin in the cavity by retracting the centering pin before the molten resin is solidified, thereby obtaining laminated moldings having good quality and appearance.

Formed sheet made of resin such as, for instance, polyurethane, polystyrene and polyethylene, and a laminated sheet integrated with other facing member such as film at least on one side of the formed sheet can be used as the surface member.

The facing member may preferably be a general film and sheet, a resin-made sheet and film having decorative patterns printed thereon, woven fabric and non-woven fabric or the like.

The synthetic resin constituting the molding body as a base may preferably be a thermoplastic resin such as polypropylene, polystyrene, polyethylene, ABS, polycarbonate, and composition of various additives to the thermoplastic resin.

The additives may be filler such as talc, mica and glass fiber, stabilizing agent for preventing deterioration by heat, light etc., and coloring agent.

The die body may preferably include a stationary die and a movable die advanceable and retractable relative to the stationary die, and the centering pin may protrude into and retract from the cavity in synchronization with advancement and retraction of the movable die.

In other words, when the centering pin protrudes synchronizing with the retraction of the movable die (opening the mold) and the centering pin retracts synchronizing with the advancement of the movable die (clamping the mold), the surface member can be easily and securely positioned by the centering pin since the centering pin can be protruded by only opening the die body.

Further, since the centering pin can be retracted when the die body is closed, the portion where the centering pin protrudes in the cavity can be securely filled by the resin, thereby obtaining good appearance.

In the above, the centering pin is preferably provided respectively to the stationary die and the movable die.

By providing the centering pins on both of the stationary die and the movable die, the surface members can be laminated on both sides of the molding body without causing position shift.

The die body may further include a slide die advanceable and retractable relative to the cavity, and the centering pin may retract from the cavity in accordance with the advancement of the slide die.

By retracing the centering pin in accordance with the advancement of the slide die, the position-determined surface member can be retained to the protruding centering pin until the completion of the advancement of the slide die, i.e., until the completion of compression of the molten resin, when the slide die is advanced to compress the molten resin, thereby conducting injection compression molding. Accordingly, since the surface member can be retained on the centering pin until the compression is completed and the molten resin substantially stops flowing, the surface member can not easily be pushed away by the resin flow, so that the position shift of the surface member by the resin pressure can be avoided.

Further, by advancing the slide die to compress the molten resin, the molten resin can be securely spread (filled) into the entirety of the cavity. Therefore, the molding body corresponding to the cavity configuration can be obtained and the molten resin can be securely flown into the portion where the centering pin is protruded in the cavity, the portion where the centering pin protruded in the cavity can be securely filled up.

The centering pin may be provided respectively to the slide die and a portion of the die body opposite to the slide die.

By opposingly providing the centering pins to the cavity, the surface member can be securely laminated on both sides of the molding body without causing position shift.

Another aspect of the present invention is a producing method of laminated molding for integrally shaping the laminated molding, the laminated molding having a molding body made of synthetic resin and a compressible surface member laminated thereonto. The producing method includes the steps of; providing a molding die having a molding body including a cavity for shaping the laminated molding and a centering pin protrudable and retractable relative to the cavity; protruding the centering pin relative to the cavity to determine a position of the surface member by piercing a predetermined portion of the surface member with the centering pin; and injecting a molten resin into the cavity to perform injection molding or injection compression molding.

In the present invention, since the surface member is positioned by piercing the surface member to the centering pin of the molding die, the surface member can be positioned accurately and easily to a predetermined position in the cavity and can be retained in the condition, so that the position shift of the surface member can be securely prevented.

In the above, after determining the position of the surface member, the molding body is preferably closed simultaneously with compression of the surface member and the molten resin is preferably injected into the cavity while the molding die is closed and the surface member is compressed.

By compressing the surface member of which position is determined, the surface member can be retained while the position of the surface member is determined. Therefore, the surface member can be prevented from being pushed away by the flow of the molten resin, thereby preventing position shift of the surface material by the resin pressure.

Further, the die body preferably includes a slide die advanceable and retractable relative to the cavity, the surface member is preferably compressed by advancing the slide die relative to the cavity, the slide die is preferably temporarily retracted relative to the cavity after initiation of the injection of the molten resin, and the slide die is preferably advanced toward the cavity to compress the molten resin.

By compressing the surface member by the advancement of the slide die, the surface member can be sandwiched between the slide die and a portion of the slide die opposing the die body, thereby fixing the surface member in a condition where the position of the surface member is determined.

Further, since the slide die is once retracted after the completion of the injection, the injection pressure can be set low, thereby largely decreasing damage applied on the surface member.

Since the retracted slide die is re-advanced, the molten resin can be spread to the entirety of the cavity, thereby obtaining superior moldability.

BRIEF DESCRIPTION OF DRAWINGS

FIG. 10 is a perspective view showing laminated molding according to the third embodiment;

BEST MODE FOR CARRYING OUT THE INVENTION

Respective preferred embodiments of the present invention will be described below with reference to attached drawings.

[First Embodiment]

Figure 1:
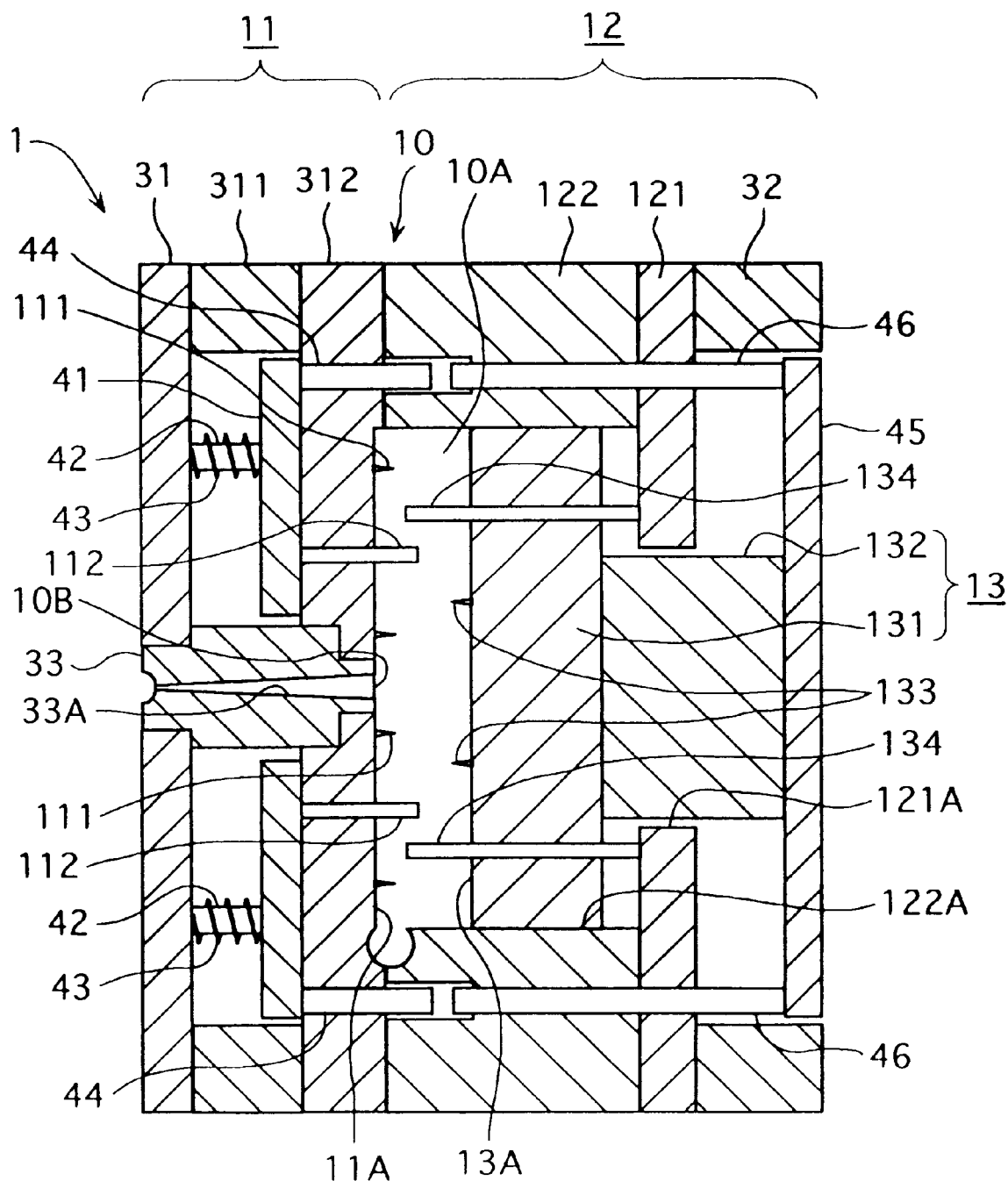
FIG. 1 is a cross section showing first embodiment of the present invention.

FIG. 1 shows a molding die 1 according to the present embodiment.

Figure 2:
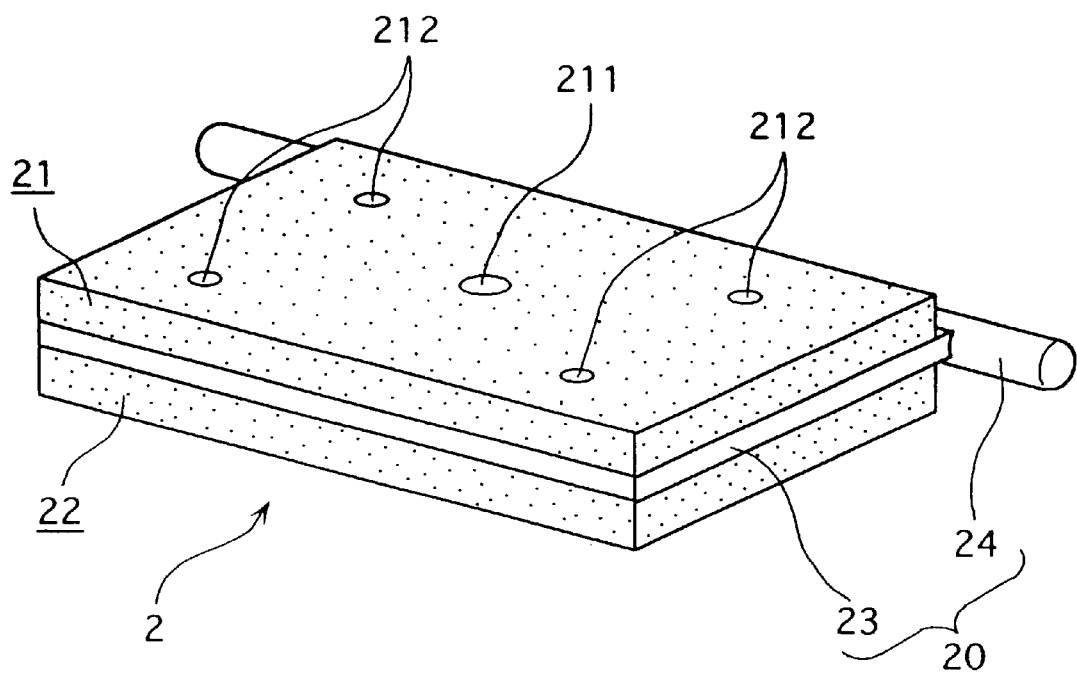
FIG. 2 is a perspective view showing laminated molding according to the first embodiment.

The molding die 1 of the present embodiment is, as shown in FIG. 2, for shaping a laminated molding 2 having a molding body 20 made of synthetic resin and surface members 21 and 22 laminated to both sides of the molding body 20.

Specifically, the laminated molding 2 is an air-current control valve installed in a duct (not shown) to open and close the duct for circulating air etc., which has a rectangular plate-shaped valve body 23 and a rotation shaft provided along a side of the valve body 23 to open and close the duct (not shown) by turning around the rotation shaft 24.

On both sides of the valve body 23, the surface members 21 and 22 are laminated all over the sides in order to secure air-tightness.

The surface members 21 and 22 are formed into a rectangular plate shape corresponding to the valve body 23, which is made of a compressible material such as elastically deformable flexible material, for instance, polyurethane formed sheet.

The first surface member 21 laminated onto one side of the valve body 23 has a gate hole 211 for a gate 10B (see FIG. 1) for the molten resin to be injected, and a plurality of centering hole 212 for inserting below-mentioned centering pins.

A centering hole 222 (see FIG. 3) is formed on the second surface member 22 laminated to the other side of the valve body 23.

Back to FIG. 1, the molding die 1 has a die body 10 and is constructed to be opened and closed. The die body 10 has a stationary die 11 including a stationary platen 31 attached to a stationary die plate 312 through a spacer 311, a movable die 12 composed by combining first movable die plate 121 and second movable die plate 122, and a block-shaped slide die 13 disposed to a central portion of the movable die 12.

A cavity 10A for shaping the laminated molding 2 is formed inside the die body 10 when the stationary die 11 and the movable die 12 are closed (clamped).

The stationary die plate 312 and the stationary platen 31 has a sprue bush 33 penetrating respective central portion thereof, the sprue bush 33 forming a sprue 33A for introducing the molten resin into the cavity 10A. The sprue 33A according to the present embodiment has an opening at the central portion of the cavity 10A, which forms the gate 10B.

Approximately entire surface of the molding surface of the stationary die 11 (stationary die plate 312) is made to be attachment surface 11A for attaching the first surface member 21 to be laminated to one side of the valve body 23 (see FIG. 2). A needle portion 111 for securing the first surface member 21 is protruded from the attachment surface 11A.

A centering pin 112 for positioning the first surface member 21 is provided to the stationary die 11. The centering pin 112 is protrudable into and retractable from the attachment surface 11A to the cavity 10A.

In other words, the centering pin 112 pierces the stationary die plate 312 and is connected to a stationary-side advancing plate 41 disposed between the stationary platen 31 and the stationary die plate 312.

The stationary-side advancing plate 41 is provided parallel to the stationary die plate 312 and slides between the stationary die plate 312 and the stationary platen 31 along a slide shaft 42 piercing the plate 41.

An end of the centering pin 112 is connected to the stationary-side advancing plate 41, and the centering pin 112 protrudes and retracts relative to the cavity 10A in accordance with slide (advancement and retraction) of the stationary-side advancing plate 41.

The centering pin 112 protrudes the farthest from the stationary die plate 312 into the cavity 10A when the stationary-side advancing plate 41 abuts the stationary die plate 312. In other words, the stationary-side advancing plate 41 is a stopper for restricting advancement and retraction range of the centering pin 112.

A spring 43 is wound to a portion of the slide shaft 42 between the stationary-side advancing plate 41 and the stationary platen 31, thereby biasing the stationary-side advancing plate 41 to be pressed onto the stationary die plate 312.

A retracting rod 44 for sliding the stationary-side advancing plate 41 to the stationary platen 31, i.e. retracting toward the stationary die plate 312, is provided to the stationary-side advancing plate 41. The retracting rods 44 pierce the stationary die plate 312 parallel to the centering pin 112.

On the other hand, the first movable die plate 121 of the movable die 12 has an opening 121A at a central portion thereof. Frame-shaped second movable die plate 122 is attached to a side of the first movable die plate 121 facing the stationary die 11 and a die attachment base 32 is mounted to a side opposite to the stationary die 11 side.

Respective openings 121A and 122A of the first and the second movable die plates 121 and 122 are mutually intercommunicated and the openings 121A and 122A are provided with the slide die 13 capable of advancing and retracting relative to the cavity 10A.

The slide die 13 has a rectangular plate-shaped body portion 131 slidable at the opening 122A of the second movable die plate 122 and a connecting portion 132 attached to a central portion of the body portion 131 and inserted to the opening 121A of the first movable die plate 121.

The connecting portion 132 is connected to a movable-side advancing plate 45 disposed parallel to the first movable die plate 121.

The movable-side advancing plate 45 advances and retracts parallel to an advancing direction of the movable die 12 relative to the movable die 12 by a driving mechanism (not shown) so that the slide die 13 advances and retracts in synchronization with the advancement and retraction movement of the movable-side advancing plate 45.

The movable-side advancing plate 45 has a pushing rod 46 coaxial with the above-mentioned retracting rod 44 of the stationary die 11.

The pushing rod 46 separates from the retracting rod 44 in a condition that the movable-side advancing plate 45 retracts relative to the movable die 12 and abuts the retracting rod 44 to press by advancing the movable-side advancing plate 45 from the condition.

In other words, the movable-side advancing plate 45 advances to move the pushing rod 46 to press the retracting rod 44 in a direction to sink (separate) from the stationary die plate 312. By the retraction of the retracting rod 44, the centering pin 112 in company with the stationary-side advancing plate 41 retracts relative to the cavity 10A.

As described above, the centering pin 112 projectingly provided to the stationary die 11 sinks relative to the cavity 10A in synchronization with the advancement of the slide die 13.

A molding surface of the slide die 13 is an attachment surface 13A for attaching the second surface member 22 laminated to the other side of the valve body 23. The movable-side advancing plate 45 retracts so that the attachment surface (molding surface) 13A sinks into the movable die 12, and, in the above condition, the second surface member 22 is fitted to a portion surrounded by the attachment surface 13A and the movable die 12 (second movable die plate 122).

Similarly to the stationary die 11, a needle portion 133 for fixing the second surface member 22 is projectingly provided to the attachment surface 13A.

A centering pin 134 for determining the position of the second surface member 22 is provided to the attachment surface 13A of the slide die 13. The centering pin 134 can be protruded and retracted from the molding surface of the slide die 13 to the cavity 10A.

In other words, the centering pin 134 pierces the slide die 13 and the base end portion is fixed to the aforesaid first movable die plate 121 of the movable die 12. Accordingly, by sliding the slide die 13 along the second movable die plate 122 and the centering pin 134, the centering pin 134 relatively protrudes and retracts from the slide die 13 to the cavity 10A.

As described above, the centering pin 134 protruding from the slide die 13 retracts relatively to the cavity 10A in accordance with the advancement of the slide die 13.

According to thus arranged present embodiment, the laminated molding 2 is manufactured by an injection compression molding method in accordance with the following steps.

The surface members 21 and 22 are prepared in advance. The gate hole 211 and the centering hole 212 are formed on the first surface member 21 attached to the stationary die 11. The centering hole 222 are solely formed to the second surface member 22 attached to the slide die 13.

Figure 3:
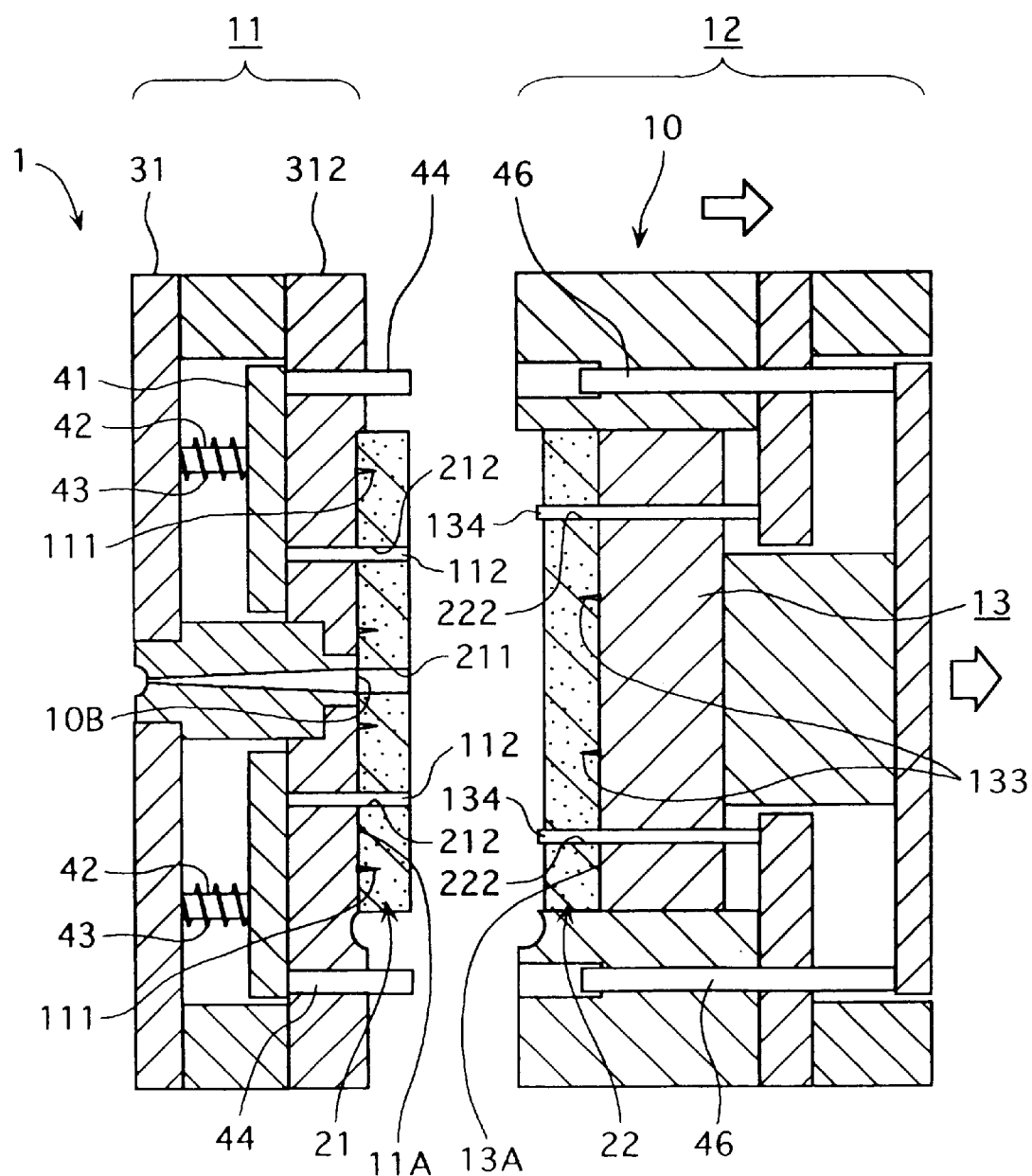
FIG. 3 is a cross section showing a condition where a die body of the first embodiment is opened.

As shown in FIG. 3, the movable die 12 is retreated relatively to the stationary die 11 to open the die body 10 and, simultaneously, the slide die 13 is retreated relatively to the movable die 12 by an advancing and retreating mechanism (not shown) so that the attachment surface 13A of the slide die 13 is sunk in the movable die 12.

Then, the centering pin 134 relatively protrudes from the attachment surface 13A of the slide die 13 so that the centering pin 134 protrudes more than or the same as the thickness of the second surface member 22.

The stationary-side advancing plate 41 is pressed onto the stationary die plate 312 by the biasing force of the spring 43 and the centering pin 112 protrudes from the attachment surface 11A of the stationary die 11 beyond the thickness of the first surface member 21.

Subsequently, the first surface member 21 is attached to the attachment surface 11A of the stationary die 11 and the second surface member 22 is attached to the attachment surface 13A of the slide die 13.

At this time, the centering hole 212 of the first surface member 21 is fitted to the centering pin 112 projecting from the attachment surface 11A. Then, the position of the first surface member 21 is determined relative to the stationary die 11 and the first surface member 21 is engaged to the attachment surface 11A in the condition, thereby making the gate hole 211 to be in communication with the gate 10B.

When the first surface member 21 abuts the attachment surface 11A, the needle portion 111 of the attachment surface 11A pierces the first surface member 21 to fix the first surface member 21 at an accurate position of the attachment surface 11A.

Similarly to the first surface member 21, the position of the second surface member 22 is determined and the second surface member 22 is engaged to the slide die 13 by fitting the centering hole 222 of the second surface member 22 to the centering pin 134 projecting from the attachment surface 13A. After thus arranging the mutual position of the second surface member 22 and the attachment surface 13A in a predetermined condition, the second surface member 22 is abutted to the attachment surface 13A to engage to the needle portion 133 to be fixed to the attachment surface 13A.

Figure 4:
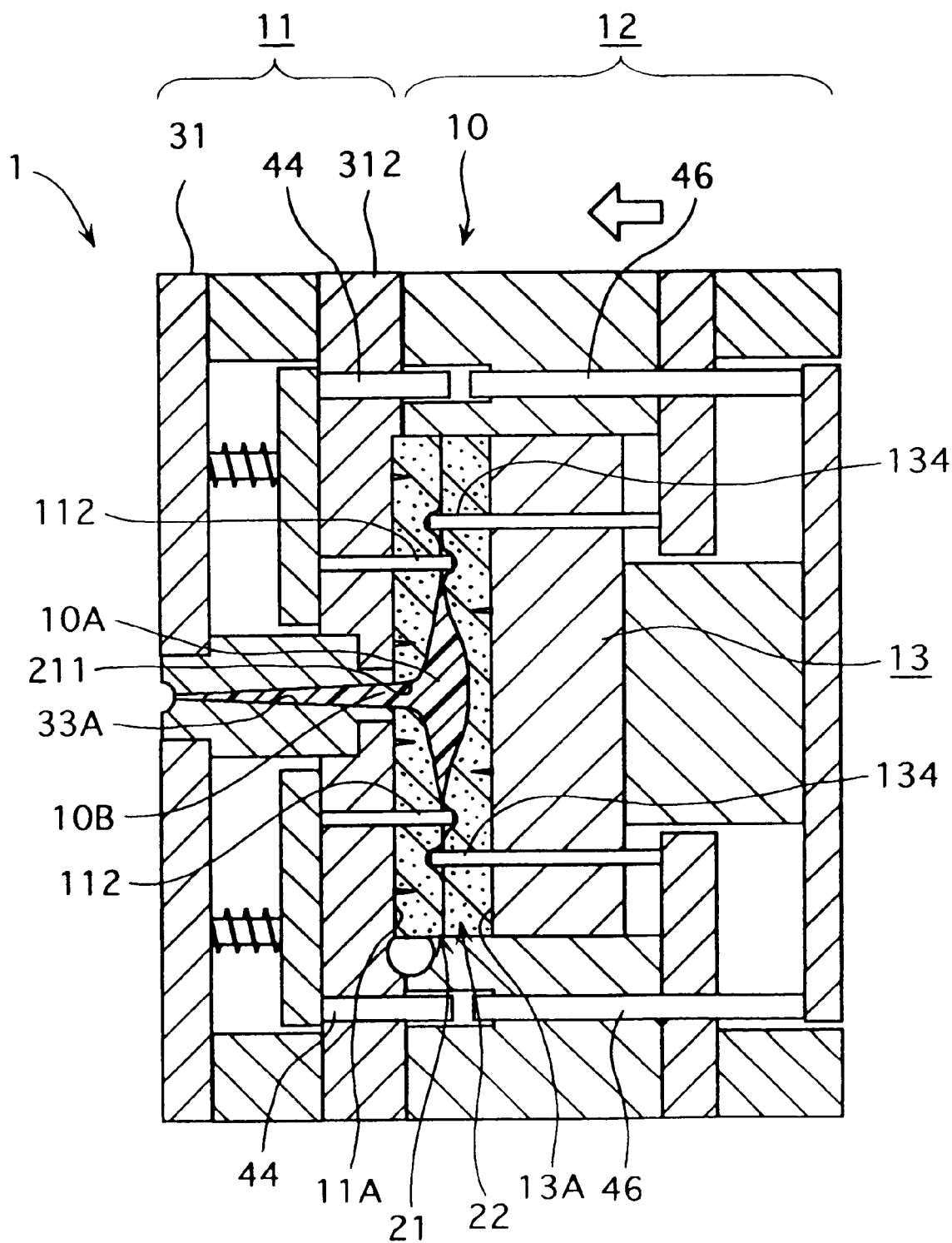
FIG. 4 is a cross section showing a condition where the die body of the first embodiment is clamped.

Subsequently, as shown in FIG. 4, the movable die 12 is advanced relative to the stationary die 11 to close and clamp the die body 10. Accordingly, the cavity 10A having larger configuration than the laminated molding 2 by the advancement amount of the slide die 13 is formed inside the die body 10.

With the die body 10 being closed, the thickness of the cavity 10A, in other words, the thickness of the cavity 10A in the moving direction of the movable die 12 is set the same as, or slightly smaller than the thickness of the first and the second surface members 21 and 22. Therefore, since the first and the second surface members 21 and 22 are touched or slightly pressed by the attachment surfaces 11A and 13A by being sandwiched by the stationary die 11 and the slide die 13, thereby securing further strongly.

Subsequently, the molten resin is injected from the gate 10B to the cavity 10A by an injection machine (not shown) through the sprue 33A.

Consequently, the molten resin bumps into the second surface member 22 through the gate hole 211 of the first surface member 21 and forms a channel by pushing the bumped portion toward the attachment surface 13A. As described above, the molten resin having formed the channel between the first and the second surface members 21 and 22 advances between the first and the second surface members 21 and 22 while forcing the first and the second surface members 21 and 22 toward respective attachment surfaces 11A and 13A to form and expand the channel.

At this time, the first and the second surface members 21 and 22 are pushed toward the respective attachment surfaces 11A and 13A by the pressure of the advancing molten resin to be compressed.

Figure 5:
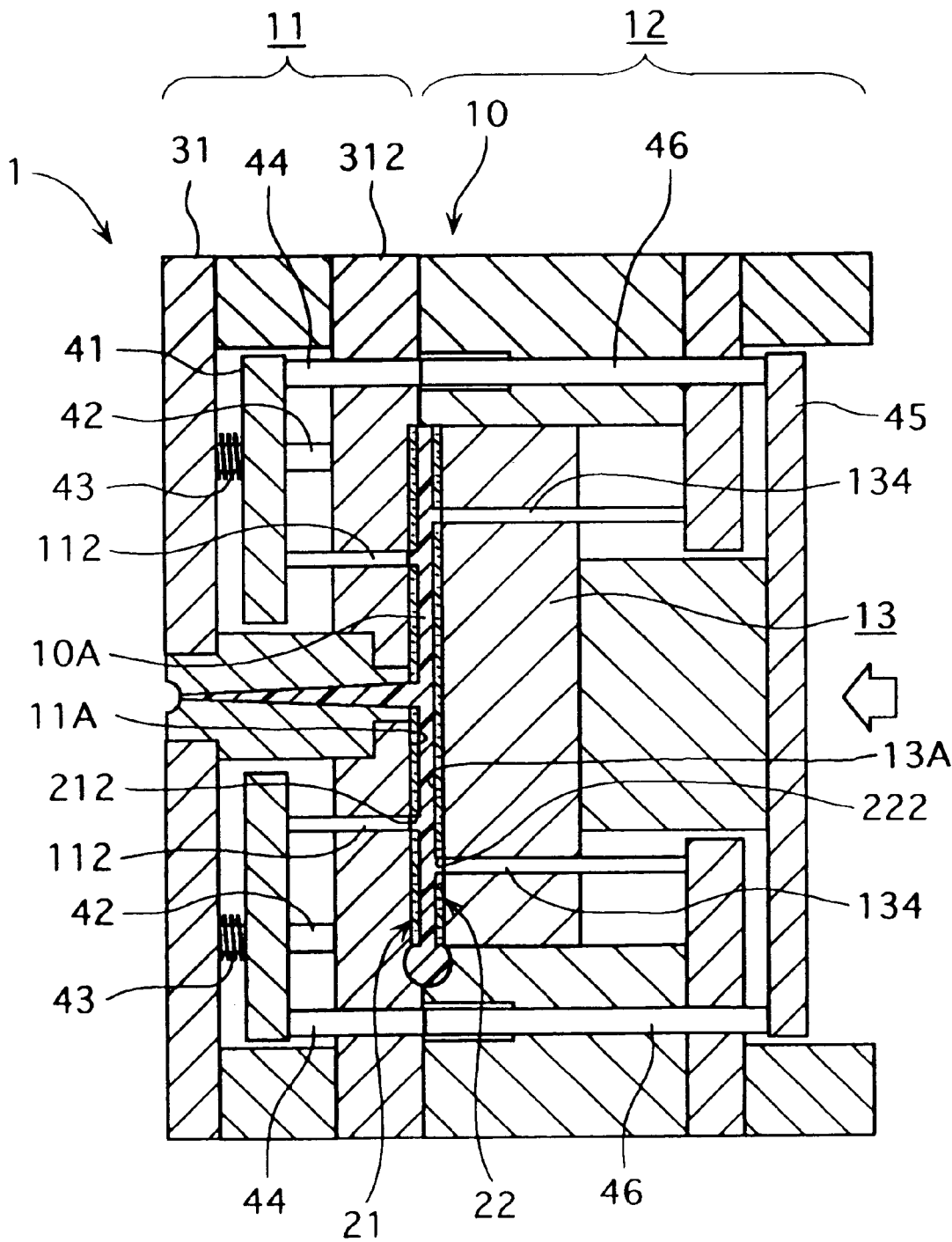
FIG. 5 is a cross section showing a condition where a slide die of the first embodiment is advanced.

At the timing substantially the same as the completion of the injection of the molten resin, more specifically, simultaneously with, immediately before completion of the injection, or immediately after the completion of the injection, the movable-side advancing plate 45 is advanced by the advancing mechanism (not shown) as shown in FIG. 5, thereby advancing the slide die 13 relative to the cavity 10A to compress the molten resin inside the cavity 10A to render shape.

At this time, the pushing rod 46 advances together with the movable-side advancing plate 45 to abut the retracting rod 44. By further advancing the movable-side advancing plate 45 (slide die 13), the retracting rod 44 is pressed by the pushing rod 46 and is retracted toward the stationary platen 31.

In synchronization with the retraction of the retracting rod 44, the movable-side advancing plate 41 moves toward the stationary platen 31, thereby retracting the centering pin 112 in a direction sinking relative to the cavity 10A.

Further, since the slide die 13 is advanced along the centering pin 134 on the slide die 13 side, the centering pin 134 retracts in a direction to sink relative to the cavity 10A.

When the slide die 13 is advanced until the cavity 10A has a configuration corresponding to the laminated molding 2, the respective projecting-end surface of the centering pins 112 and 134 are leveled with the attachment surfaces 11A and 13A respectively, and the molten resin flows to fill the centering holes 212 and 222.

After the molten resin is cooled and solidified, the mold is opened by retracting the movable die 12 and the molding body 20 integrated with the surface members 21 and 22 (see FIG. 2) is ejected from the die body 10.

In the ejecting process, the slide die 13 is retracted after the die body 10 is opened, and the laminated molding 2 is ejected.

In other words, since the slide die 13 advances along the centering pin 134, the centering pin 134 projects from the attachment surface 13A by retracting the slide die 13, thereby ejecting the laminated molding 2.

The first and the second surface members 21 and 22 of the laminated molding 2 being thus ejected return from the condition compressed flat to substantially the same configuration as of the configuration before molding.

According to the present embodiment, following effects can be obtained.

Since the centering pins 112 and 134 for positioning the first and the second surface members 21 and 22 are provided, the first and the second surface members 21 and 22 can be accurately and easily positioned relative to the attachment surfaces 11A and 13A and can be retained in the condition by engaging a predetermined portion (the centering hole 212 and 222) of the respective surface members 21 and 22 to the centering pins 112 and 134, thereby preventing the position shift of the surface members 21 and 22.

Since the centering pins 112 and 134 is protrudable and retractable relative to the cavity 10A and the centering pins 112 and 134 are sunk (retracted) before the molten resin is solidified, the projecting portion of the centering pins 112 and 134 in the cavity 10A, specifically, the respective centering holes 212 and 222 of the surface members 21 and 22 can be filled by flowing the molten resin thereinto, thereby obtaining the laminated molding 2 with good quality and appearance.

Since the centering pins 112 and 134 are retracted relative to the cavity 10A in synchronization with the advancement of the slide die 13, the first and the second surface members 21 and 22 can be retained to the projecting centering pins 112 and 134 until the advancement of the slide die 13 is completed and the centering pins 112 and 134 are completely sunk.

In other words, since the first and the second surface members 21 and 22 can be retained to the centering pins 112 and 134 substantially until the completion of the compression of the molten resin by the slide die 13, the molten resin is hardly flown by the time the compression process is completed. Therefore, the first and the second surface members 21 and 22 is not pushed away by the resin flow, thereby preventing the position shift of the surface members 21 and 22 by the resin pressure.

Since the molten resin is compressed by advancing the slide die 13, the molten resin can be securely spread (filled) in the entire cavity 10A. Therefore, the molding body 20 complying with the configuration of the cavity 10A can be obtained. Further, since the molten resin can be securely flown into the projecting portion of the centering pins 112 and 134 in the cavity 10A, i.e., the centering holes 212 and 222 of the surface members 21 and 22, the depression of the laminated molding 2 by the centering pins 112 and 134 can be securely prevented.

Since the centering pins 112 and 134 are respectively provided to the opposing stationary die 11 and the movable die 13, the first and the second surface members 21 and 22 can be securely laminated onto both sides of the molding body 20 without position shift.

Since the centering pin 134 is provided piercing the slide die 13 and the centering pin 134 is relatively protruded and retracted to the cavity 10A while the centering pin 134 is at rest by the advancement and retraction of the slide die 13, the laminated molding 2 can be ejected by the retraction of the slide die 13, thereby using the centering pin 134 as an eject pin. Accordingly, no independent eject pin is required, thus simplifying the mold structure.

Since the respective surface members 21 and 22 are positioned by fitting the respective centering holes 212 and 222 of the first and the second surface members 21 and 22 to the centering pins 112 and 134, the first and the second surface members 21 and 22 can be accurately and easily positioned at a predetermined point relative to the attachment surfaces 11A and 13A.

Further, since the first and the second surface members 21 and 22 are compressed by advancing the slide die 13 after positioning the first and the second surface members 21 and 22, the first and the second surface members 21 and 22 can be retained within the cavity 10A in a positioned condition by being compressed and sandwiched by the attachment surfaces 11A and 13A. Therefore, the first and the second surface members 21 and 22 can be prevented from being pushed away by the flow of the molten resin, thereby preventing the position shift by the surface members 21 and 22 by the resin pressure.

[Second Embodiment]

Figure 6:
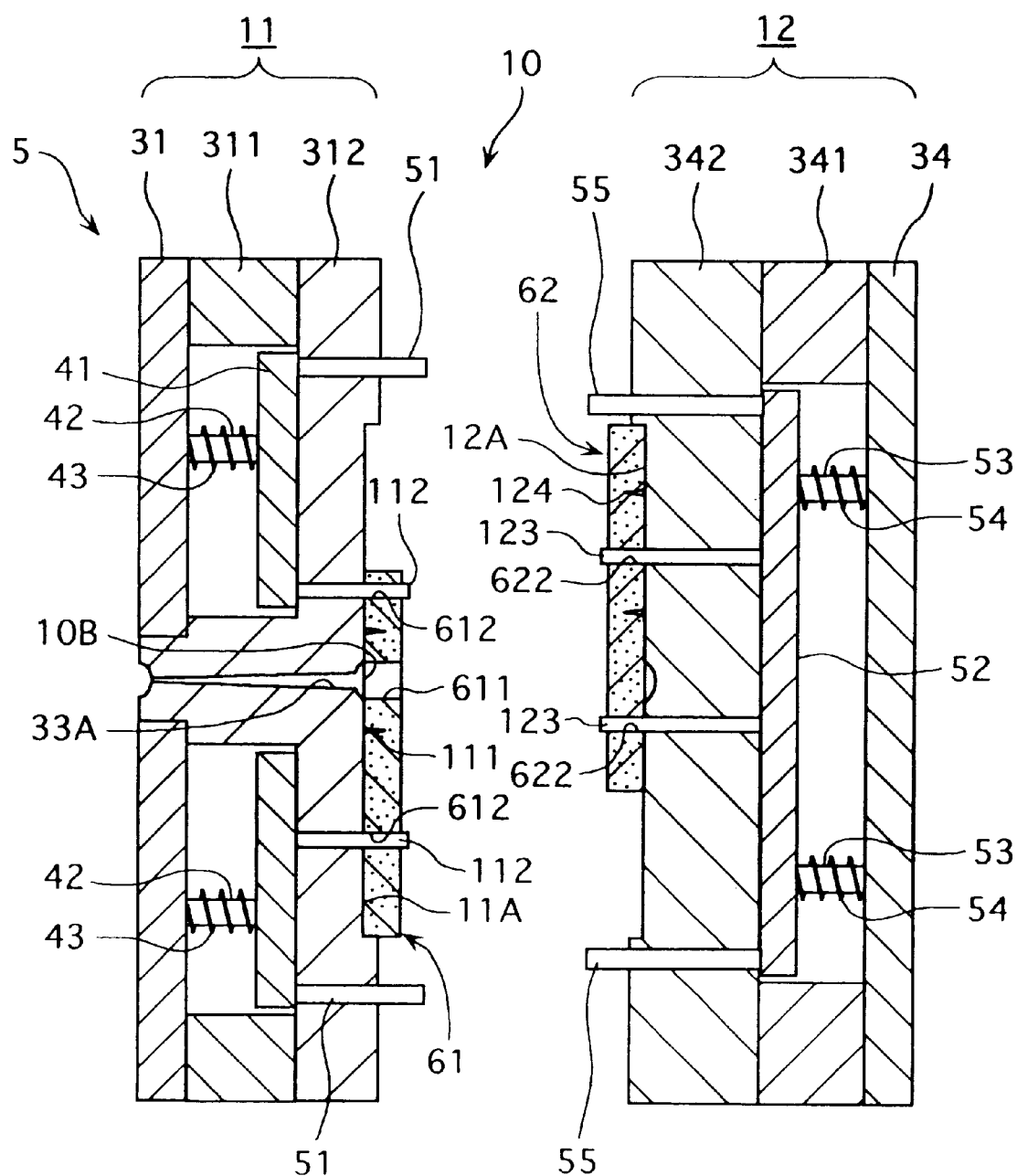
FIG. 6 is a cross section showing second embodiment of the present invention.

The slide die 13 of the molding die 1 according to the first embodiment is omitted in a molding die 5 according to the present embodiment shown in FIG. 6 and the centering pins are protruded and retracted by opening and closing the die body. Identical reference numerals are applied to portions identical with FIG. 1 to 5 omitting detailed explanation. Only different arrangement will be described below.

Figure 7:
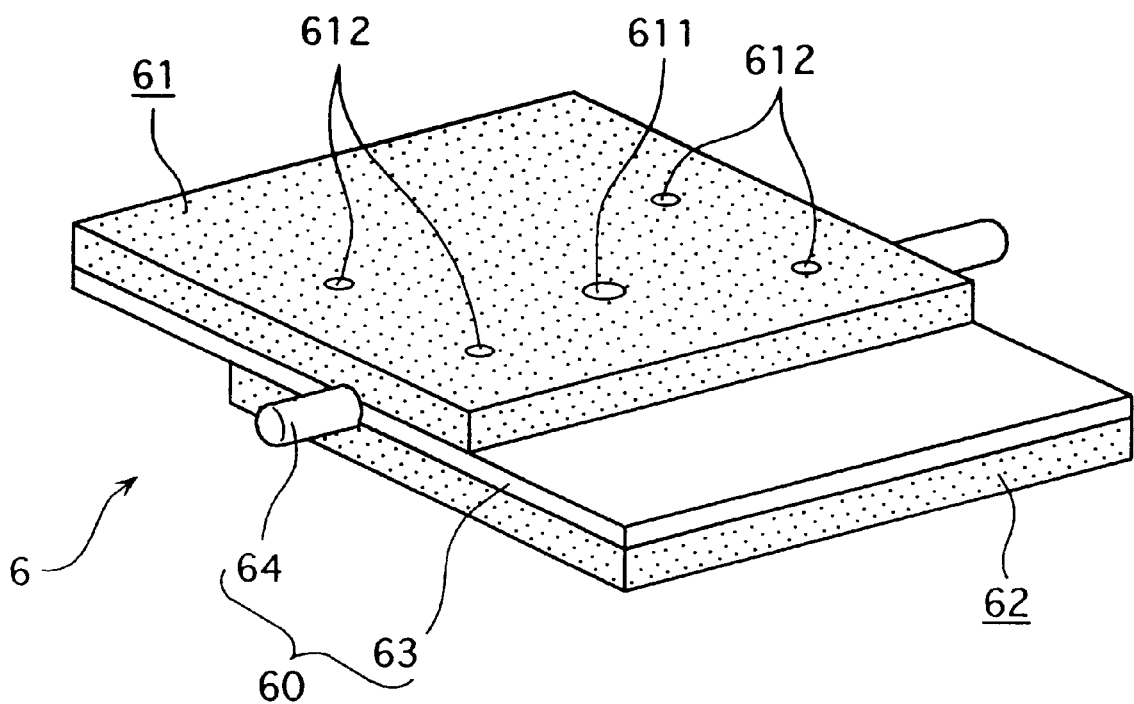
FIG. 7 is a perspective view showing laminated molding according to the second embodiment.

As shown in FIG. 7, the molding die 5 according to the present embodiment is for shaping a laminated molding 6 having a synthetic-resin made molding body 60 and surface members 61 and 62 laminated on both sides of the molding body 60.

The laminated molding 6 is an air-current control valve used substantially in the same manner as the first embodiment, which has a rectangular plate-shaped valve body 63 and a rotation shaft 64 provided at a central portion of the valve body 63.

The surface members 61 and 62 are made of the same kind of material as the aforesaid first embodiment. The first surface member 61 laminated onto one side of the valve body 63 has a gate hole 611 for a gate from which the molten resin is injected in molding process and a plurality of centering hole 612 for inserting below-described centering pins.

The second surface member 62 laminated onto the other side of the valve body 63 has a centering hole 622 (see FIG. 6).

The first and the second surface members 61 and 62 have smaller dimension than the valve body 63 in a direction orthogonal with the rotation shaft 64 and are integrated on respective sides of the valve body 63 at positions symmetrical to the rotation shaft 64.

Back to FIG. 6, the die body 10 has the stationary die 11 including the stationary platen 31 and the stationary die plate 312 connected thereto through the spacer 311, and the movable die 12 having the movable platen 34 attached with the movable die plate 342 through the spacer 341. The cavity 10A for shaping the laminated molding 6 (see FIG. 8) is formed therein when the die is clamped.

The centering pins 112 and 123 of the present embodiment are provided to the stationary die 11 and the movable die 12 respectively.

In other words, a lower part of the molding surface of the stationary die plate 312 is the attachment surface 11A for attaching the first surface member 61 and the centering pin 112 of the present embodiment is protrudable and retractable from the attachment surface 11A.

The stationary-side advancing plate 41 having the centering pin 112 thereon is provided with a stationary-side return pin 51 for sliding the stationary-side advancing plate 41 in a direction of the stationary platen 31, i.e. for retracting toward the stationary die plate 312. The stationary-side return pins 51 pierces the stationary die plate 312 parallel to the centering pin 112.

An upper portion of the molding surface of the movable die plate 342 of the movable die 12 is the attachment surface 12A for attaching the second surface member 62. A needle portion 124 for fixing the second surface member 62 is projectingly provided to the attachment surface 12A in the same manner as the stationary die plate 11.

The centering pin 123 of the present embodiment pierces the movable die plate 342 and protrudes and retracts from the attachment surface 12A to the cavity 10A.

In other words, the centering pin 123 is connected to the movable-side advancing plate 52 provided between the movable platen 34 and the movable die plate 342.

The movable-side advancing plate 52 is a plate-shaped member extending parallel to the movable die plate 342, which slides between the movable die plate 342 and the movable platen 34 along the slide shaft 53 piercing the plate 52.

An end of the centering pin 123 is connected to the movable-side advancing plate 52, which protrudes and retracts relative to the cavity 10A in accordance with a slide (advance and retraction) of the movable-side advancing plate 52.

The centering pin 123 protrudes the farthest from the movable die plate 342 into the cavity 10A when the movable-side advancing plate 52 abuts the movable die plate 342. In other words, the movable-side advancing plate 52 is a stopper for restricting the advancement and retraction range of the centering pin 123.

A spring 54 is wound at a portion of the slide shaft 53 between the movable-side advancing plate 52 and the movable platen 34, which biases the movable-side advancing plate 52 in a direction to press the movable die plate 342.

A movable-side return pin 55 for sliding the movable-side advancing plate 52 in a direction of the movable platen 34, i.e. for retracting relative to the movable die plate 342, is disposed on the movable-side advancing plate 52. The movable-side return pin 55 pierces the movable die plate 342 parallel to the centering pin 123.

In thus arranged the present embodiment, the laminated molding 6 is manufactured according to below-mentioned steps.

The gate hole 611 and the centering holes 612 and 622 are formed in advance respectively to the first and the second surface members 61 and 62 and the die body 10 is set open in the same manner as the first embodiment.

The stationary-side advancing plate 41 and the movable-side advancing plate 52 is pressed to the respective dies 11 and 12 by the biasing force of the springs 43 and 54, thereby projecting the centering pins 112 and 123 from the attachment surfaces 11A and 12A.

The first surface member 61 is attached to the attachment surface 11A of the stationary die 11 and the second surface member 62 is attached to the attachment surface 12A of the movable die 12 in the same manner as the first embodiment.

Figure 8:
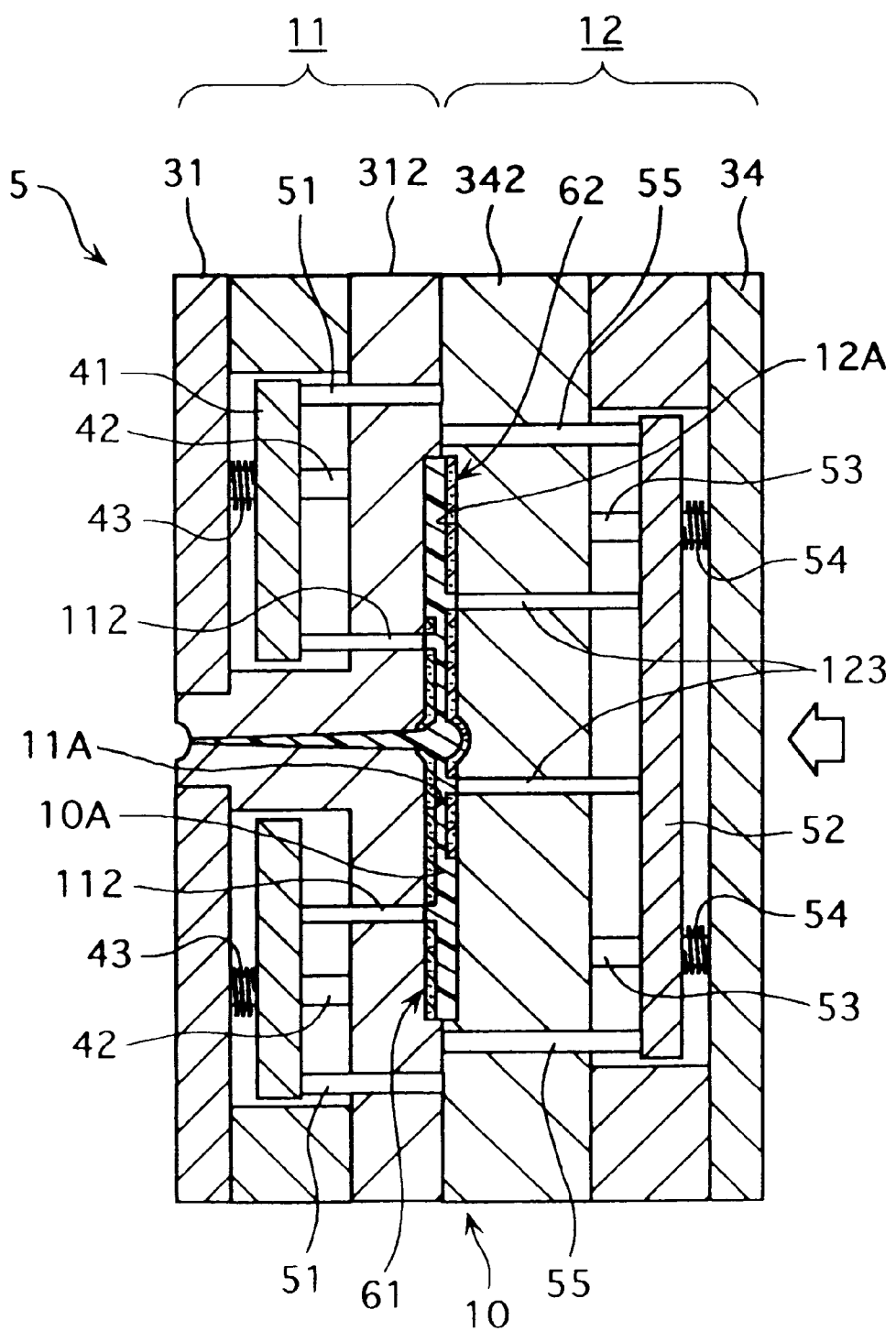
FIG. 8 is a cross section showing a condition where a die body according to the second embodiment is clamped.

Subsequently, as shown in FIG. 8, the die body 10 is closed and clamped by advancing the movable die 12 toward the stationary die 11.

Accordingly, the cavity 10A having configuration corresponding to the laminated molding 6 is formed inside the die body 10.

The thickness of the cavity 10A is the same as or slightly smaller than a thickness of the first and the second surface members 61 and 62 being piled. Therefore, the stationary die 11 and the movable die 12 sandwiches the first and the second surface members 61 and 62, the first and the second surface members 61 and 62 being firmly fixed by contacting or slightly pressed by the attachment surfaces 11A and 12A.

When the movable die 12 is advanced, the movable die plate 342 of the advancing movable die 12 abuts to the stationary-side return pin 51 projecting from the stationary die 11 and the movable-side return pin 55 projecting from the movable die 12 abuts to the stationary die plate 312 of the stationary die 11.

By further advancing the movable die 12, the return pins 51 and 55 are pushed by the respective dies 11 and 12 so that the stationary-side return pin 51 is retracted toward the stationary platen 31 in a direction sinking into the stationary die plate 312 and the movable-side return pin 55 is retracted toward the movable platen 34 in a direction sinking into the movable die plate 342.

Synchronizing with the retraction of the return pins 51 and 55, the stationary-side advancing plate 41 and the movable-side advancing plate 52 moves toward the stationary platen 31 side and the movable platen 34 side respectively, thereby retracting the centering pins 112 and 123 in a direction sinking into the cavity 10A.

In other words, the centering pins 112 and 123 retract relative to the cavity 10A by the return pins 51 and 55 in synchronization with the clamping action.

When the die body 10 is completely closed, the respective end surface in protruding direction of the centering pins 112 and 123 is made flat relative to the attachment surfaces 11A and 12A. In the condition, as described above, since the first and the second surface members 61 and 62 are compressed and fixed to the attachment surfaces 11A and 12A, the surface members do not cause position shift even when the centering pins 112 and 123 are drawn out from the centering holes 612 and 622.

Thereafter, as in the aforesaid first embodiment, the molten resin is injected to the cavity 10A to fill the cavity 10A from a space between the first and the second surface members 61 and 62 for rendering shape.

After the molten resin is cooled and solidified, the molding body 60 (see FIG. 7) having the first and the second surface members 61 and 62 being integrated is ejected from the die body 10 by opening the molds.

In other words, since the return pins 51 and 55 are set free from the pressure applied by the dies 11 and 12, the centering pins 112 and 123 respectively protrude from the attachment surfaces 11A and 12A by the biasing force of the springs 43 and 54, thereby ejecting the molding 6.

According to the above-described present embodiment, following effects can be obtained as well as the same functions and effects as the aforesaid first embodiment.

Since the centering pins 112 and 123 protrude in synchronization with the retraction (opening the mold) of the movable die 12 and the centering pins 112 and 123 sink in synchronization with the advancement (clamping the mold) of the movable die 12, the centering pins 112 and 123 can be protruded by merely opening the die body 10, thereby facilitating to determine the position of the first and the second surface members 61 and 62.

Since the centering pins 112 and 123 can be sunk when the die body 10 is closed, the portion where the centering pins 112 and 123 protrudes in the cavity 10A can be securely filled by the resin. Accordingly, the depression by the centering pins 112 and 123 is not formed to the laminated molding 6, thereby obtaining good appearance.

Since the centering pins 112 and 123 are respectively formed to the stationary die 11 and the movable die 12, the first and the second surface members 61 and 62 can be securely laminated on the both sides of the molding body 60 at a predetermined position.

[Third Embodiment]

Figure 9:
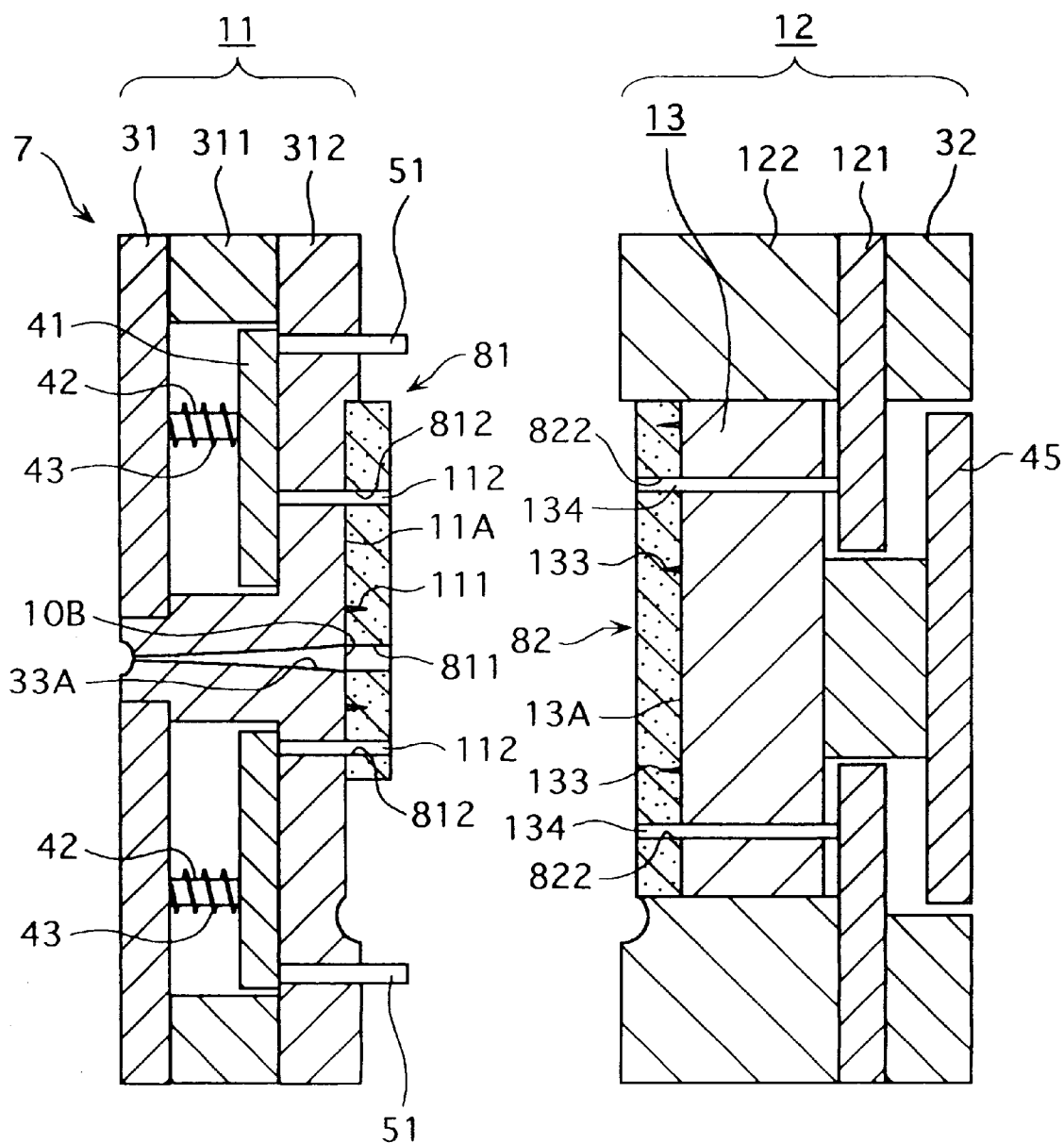
FIG. 9 is a cross section showing third embodiment of the present invention.

A molding die 7 according to the present embodiment shown in FIG. 9 has a combination of the centering pin 134 protrudable and retractable by the advancement and retraction of the slide die 13 of the aforesaid first embodiment and the centering pin 112 protrudable and retractable by opening and closing the die body 10 of the second embodiment. Identical reference numeral is applied to portions identical with FIG. 1 to 8 to omit detailed explanation, and only different parts will be described below in detail.

As shown in FIG. 10, the molding die 7 according to the present embodiment is for shaping a laminated molding 8 having a synthetic-resin made molding body 80 attached with surface members 81 and 82 on both sides thereof.

The laminated molding 8 is an air-current control valve used substantially in the same manner as the first embodiment, which includes a rectangular-plate shaped valve body 83 and a rotation shaft 84 extending along a side of the valve body 83.

The surface members 81 and 82 are made of the same material as in the first embodiment. The first surface member 81 laminated on one side of the valve body 83 has a gate hole 811 and a centering hole 812. The second surface member 82 laminated on an entire surface of the other side has a centering hole 822 (see FIG. 9) formed thereon.

The first surface member 81 has a smaller dimension in a direction orthogonal with the rotation shaft 84 than the second surface member 82 and is integrated at a position remote from the rotation shaft 84.

Back to FIG. 9, the centering pins 112 and 134 of the present embodiment are respectively provided to the stationary die 11 and the slide die 13.

In other words, an upper portion of the molding surface of the stationary die plate 312 of the stationary die 11 is the attachment surface 11A for attaching the first material 81. The centering pin 112 according to the present embodiment is protrudable and retractable from the attachment surface 11A by the advancement and the retraction of the movable die 12, i.e. the opening and closing action of the die body 10, in the same manner as in the second embodiment.

The molding surface of the slide die 13 is the attachment surface 13A for attaching the second surface member 82. And the centering pin 134 of the present embodiment is relatively protruded and retracted from the attachment surface 13A to the cavity 10A by the advancement and retraction of the slide die 13, in the same manner as in the first embodiment.

Incidentally, the pushing rod 46 (see FIG. 1) in the first embodiment is omitted in the present embodiment.

In thus arranged present embodiment, the laminated molding 8 is manufactured by injection compression method according to substantially the same process as in the first embodiment.

Figure 11:
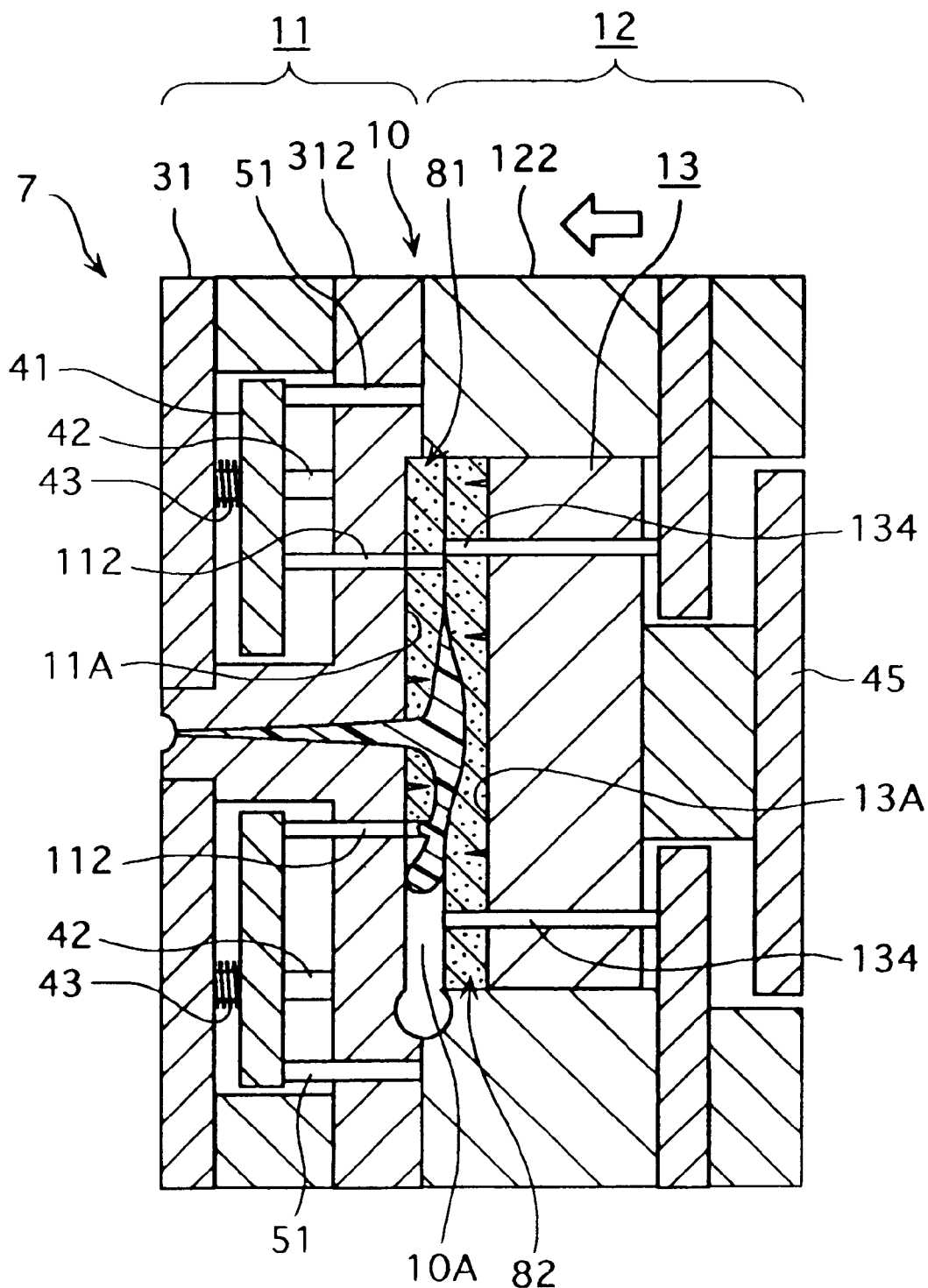
FIG. 11 is a cross section showing a condition where a die body of the third embodiment is clamped.

During the process, when the movable die 12 is advanced to the stationary die 11 to close the die body 10 after the first and the second surface members 81 and 82 are attached, the stationary-side return pin 51 is moved being pressed by the second movable die plate 122 of the movable die 12 to the stationary platen 31 side as shown in FIG. 11, thereby retracting the centering pin 112 in a direction sinking from the cavity 10A.

When the die body 10 is completely closed, the end surface of the centering pin 112 in the protruding direction thereof is made flat relative to the attachment surface 11A. In the condition, since the first and the second surface members 81 and 82 are fixed to the attachment surfaces 11A and 13A while being slightly compressed, the first surface member 81 does not cause position shift even when the centering pin 112 is drawn out of the centering hole 812.

Figure 12:
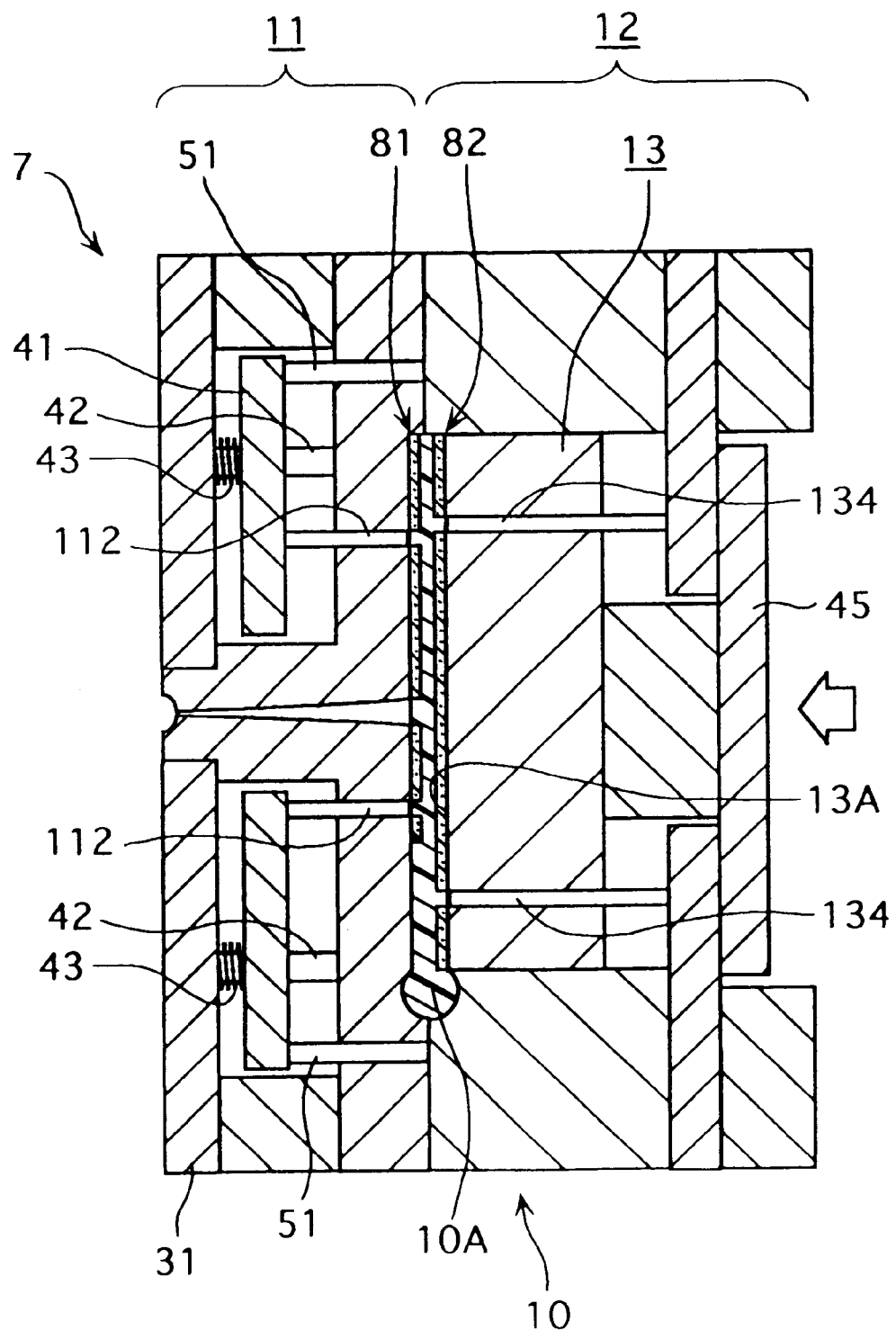
FIG. 12 is a cross section showing a condition where a slide die of the third embodiment is advanced.

After initiating the injection of the molten resin, since the slide die 13 is slid and advanced along the movable die 12 and the centering pin 134 when the slide die 13 is advanced to the cavity 10A as shown in FIG. 12, the centering pin 134 is retracted relative to the cavity 10A and the end surface of the centering pin 134 in the protruding direction is made flat with the attachment surface 13A when the slide die 13 completes advancement thereof.

Accordingly, the molten resin is flown into the respective centering hole 812 and 822 of the first and the second surface members 81 and 82.

After the molten resin is cooled and solidified, the molding body 80 (see FIG. 10) having the first and the second surface members 81 and 82 integrated thereon is ejected from the die body 10 by opening the mold.

In other words, when the movable die 12 is retracted, the centering pin 112 is protruded from the attachment surface 11A by the biasing force of the spring 43, thereby pushing out the molding 8 to be separated from the stationary die 11. Subsequently, by retracting the slide die 13, the centering pin 134 is protruded from the attachment surface 13A to eject the laminated molding 8.

According to the present embodiment, the same functions and effects as the first and the second embodiment can be obtained. Furthermore, since the pushing rod 46 (see FIG. 1) of the first embodiment can be omitted, thereby simplifying the structure.

[Modification]

Incidentally, the present invention is not restricted to the above-described embodiments but includes other arrangement etc. which can attain the objects of the present invention and below-described modifications and the like is also included within the present invention.

Though the slide die 13 is advanced to compress the molten resin substantially simultaneously with the completion of the injection of the molten resin in the first and the third embodiments, the slide die 13 may be advanced relative to the cavity 10A before initiation of the injection of the molten resin to compress the surface members, and the slide die 13 may be once retracted relative to the cavity 10A immediately after initiation of the injection of the molten resin and re-advanced thereafter.

Accordingly, since the surface members can be sandwiched between the slide die 13 and the stationary die 11 by advancing the slide die 13 to compress the surface members before the injection of the molten resin, the surface members can be closely attached to the attachment surfaces 11A and 13A while being accurately positioned, thereby securely fixing the surface members to the attachment surfaces 11A and 13A.

Further, since the slide die 13 is once retracted after initiation of the injection, the injection pressure can be set low, thereby largely decreasing the damage applied to the surface member.

Since the retracted slide die 13 is re-advanced, the molten resin can be spread to the entirety of the cavity 10A, thereby obtaining good molding property.

Figure 13:
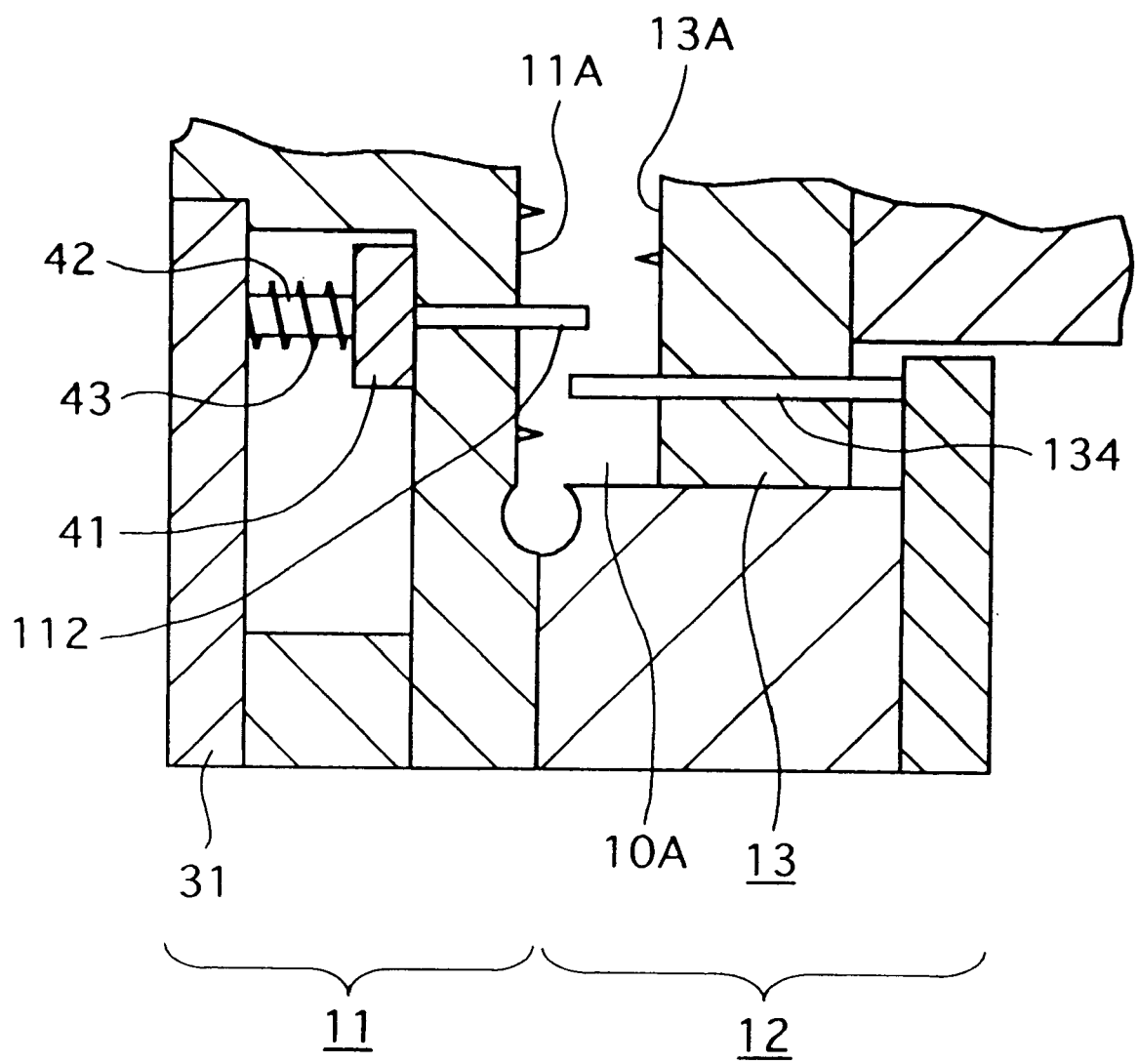
FIG. 13 is an illustration of another centering pin of the present invention.

Though the rods 44 and 46 and return pins 51 and 55 are provided so that the centering pins are protruded and retracted in synchronization with the advancement and the retraction of the slide die 13 or the opening and closing of the die body 10 in the aforesaid respective embodiments, the retracting rod 44 and the pushing rod 46 of the aforesaid first embodiment may be omitted as shown in FIG. 13 and the centering pin 112 may be directly pressed and retracted by the slide die 13.

Further, the centering pin may not necessarily be finally flat with the molding surface. For instance, the centering pin may be protruded from the molding surface by the thickness of the compressed surface members when the centering pins are retracted.

The centering pin may be protruded and retracted independently to the other actions. For instance, the centering pins may be independently advanced and retracted by the driving mechanism such as hydraulic cylinders.

Accordingly, the requirement such as advancing and retracting timing and advancing and retracting speed of the centering pins can be freely set in accordance with condition such as the fluidity of the resin.

Though the slide die 13 of the first and the third embodiment is driven by the outside advancing mechanism (not shown), the advancing mechanism may be incorporated in the movable die 12.

The slide die may be provided to the stationary die.

In the above-described embodiments, cases for manufacturing the air-current control valve having molding body and surface members laminated on both sides of the molding body are explained. However, the position for attaching the surface members in the laminated molding is not restricted. For instance, the surface member may be laminated on only one side of the molding body, or alternatively, on a part of the molding body.

When the surface member is laminated on one side of the molding body, the centering pin is only required to be provided on a portion for forming the attachment surface of the surface member, specifically, may be formed only to the stationary die or only to the movable die or the sliding die.

The laminated molding is not limited to the air-current control valve but includes air cleaner case for an automobile having surface member as a sealing member laminated periphery of the opening, a refrigerator door having surface member as a sealing member laminated in frame-shape, an automobile interior member such as door trim and inner panel or the like. In short, the laminated molding is arbitrary as long as the compressible surface member is laminated onto the synthetic-resin made molding body.

Next, the effect of the present invention will be described below based on specific experiments.

[Experiment 1]

The present experiment is a test in which an air-current control valve having the first and the second surface member integrated on both sides of the molding body (160 mm×110 mm, thickness 3.0 mm) was manufactured based on the first embodiment.

Following material, molding machine and molding condition were used in the present experiment.

(1) Material
  ① Synthetic Resin
    Material: Polypropylene (IDEMITSU PP J-2000GP manufactured by Idemitsu Petrochemical Co. Ltd.)
    MI
    (Melt Index): 21 g/10 min (230° C., 2.16 kg load)
  ② Surface member
    Material: urethane foam (Thickness 6.0 mm, expansion ratio; approximately 30×)
(2) Molding Machine
  General purpose horizontal injection molding machine (clamping force: 80 t, manufactured by NISSEI PLASTIC INDUSTRIAL Co., Ltd.) having movable platen incorporated with a compressing device (driving device) for advancing and retracting the slide die was used.

Incidentally, the compression force of the molding machine can be continuously adjustable from 0 to 100%.

(3) Molding Condition
  ① Molding Temperature: 200° C.
  ② Die Temperature: 30° C.
  ③ Injection Time: 1.8 second
  ④ Injection Pressure of Resin: 65 kg/cm² (gauge pressure)
  ⑤ Cooling Time: 40 seconds
  ⑥ Compression Amount of Slide Die: 20 mm (Advancing Amount of Slide Die)
  ⑦ Compression Initiation Timing: Simultaneously with injection completion (initiation timing of advancing slide die)
  ⑧ Compression Speed: 6 mm/second (advancing speed of slide die)
  ⑨ Compressive Force: 12 t

[Comparison 1]

In the present comparison, an air-current control valve was obtained by injection compression molding in the same manner as the above-described Experiment 1 except for using a conventional die (i.e. a die having no centering pins) as the molding die.

[Experiment 2]

The present Experiment was a test in which an air-current control valve having the first and the second surface member integrated on both sides of the molding body (180 mm×120 mm, thickness 3.0 mm) was manufactured based on the aforesaid second embodiment.

In the present Experiment, an air-current control valve was molded using the same material and molding machine as in the aforesaid Experiment 1 except for using the molding die of the aforesaid second embodiment and adopting following molding condition.

(1) Molding Condition
  ① Molding Temperature: 220° C.
  ② Die Temperature: 30° C.
  ③ Injection Time: 4.5 second
  ④ Injection Pressure of Resin: 80 kg/cm² (gauge pressure)
  ⑤ Dwell Pressure Time: 3.0 seconds
  ⑥ Dwell Pressure: 40 kg/cm² (gauge pressure)
  ⑦ Cooling Time: 40 seconds

[Comparison 2]

In the present Comparison, an air-control valve was obtained in the same manner as in the aforesaid Experiment 2 by injection molding except for using the conventional die, i.e. die having no centering pin, as the molding die.

[Result of Experiment]

Average thickness of the surface member of the air-control valves was 5.2 mm in Experiment 1 and 4.5 mm in Experiment 2.

No wrinkle caused by position shift of the surface members or projection of the surface members from the molding body could be recognized in the air-current control valve obtained by the respective Experiments. Accordingly, it can be observed that air-current control valves having superior quality such as sealability and good appearance was obtained.

On the other hand, since the setting position of the surface members is slightly shifted by the vibration etc. in clamping, a disadvantage of the surface member being integrated to the molding body with a portion thereof being extruded and another disadvantage of the molten resin being flown into a space between the stationary die plate of the stationary die and the first surface member on account of shift in the mutual position of the gate and the gate hole, were caused. Therefore, it can be observed that the air-current control valve having good quality and appearance could not be obtained in the Comparisons having no centering pins.

Industrial Availability

As described above, the molding die for the laminated molding and producing method of the laminated molding can be suitably used for a laminated molding having a molding body and compressible surface member laminated thereonto, for instance, an air-current control valve of an air-conditioner for an automobile, a laminated molding having synthetic-resin made molding body integrated with surface member such as periphery of an opening of air cleaner case of an automobile and peripheral portion of inner side of refrigerator door, and a molding die therefor.

What is claimed is:

1. A molding die for making a laminated molding comprising:

a stationary die having a stationary die plate, a stationary side advancing plate and a first retracting rod;

a first centering pin secured to said stationary die advancing plate and protruding through said stationary die plate for maintaining a first surface member; and a movable die including a second retracting rod;

wherein a cavity of the molding die is located between said stationary die plate and said movable die, closing of said molding die causing said second retracting rod to contact said first retracting rod and move said stationary side advancing plate to at least partially retract said first centering pin from the cavity.

2. The molding die according to claim 1, wherein said movable die includes a slide die.

3. The molding die according to claim 2, wherein said first centering pin is retracted during advancement of said slide die.

4. The molding die according to claim 2, including a second centering pin protruding through said slide die for maintaining a second surface member.

5. The molding die according to claim 4, wherein the second centering pin is secured to a first movable die plate of said movable die, and wherein said slide die is positioned between said first movable die plate and the cavity.

6. A molding die for making a laminated molding comprising:

a stationary die including a stationary die plate, a stationary side advancing plate and a first retracting rod, said stationary die plate being positioned between said stationary side advancing plate and a cavity of said mold die;

a first centering pin secured to said stationary die advancing plate and protruding through said stationary die plate for maintaining a first surface member; and a movable die including a first movable die plate, wherein the cavity is located between said stationary die plate and said movable die, closing of said molding die causing said first retracting rod to contact said movable die plate to move said stationary side advancing plate and said first centering pin to at least partially retract said centering pin from the cavity.

7. The molding die according to claim 6, including a second centering pin protruding through a slide die of said movable die for maintaining a second surface member, said movable die including a second retracting rod, said second retracting rod contacting said stationary die plate to move said second centering pin away from the cavity during closing of said molding die.

8. The molding die according to claim 6, including a second centering pin projecting through a slide die of said movable die for maintaining a second surface member, said slide die being movable with respect to said movable die so that advancement of said slide die retracts said second centering pin.

9. The molding die according to claim 6, including a second centering pin projecting through a slide die of said movable die for maintaining a second surface member, and wherein said first centering pin and said second centering pin are retracted in opposing directions by advancement of said slide die.

* * * * *